(No Model.) 7 Sheets—Sheet 1.

F. P. FERRY.
MACHINE FOR AUTOMATICALLY MAKING PASTEBOARD STRIPS FOR HAT PACKING RINGS.

No. 523,833. Patented July 31, 1894.

WITNESSES:
J. F. Finch.
M. S. Lougden.

INVENTOR
F. P. Ferry
BY
J. M. Smith
ATTORNEY (No Model.) 7 Sheets—Sheet 4.

F. P. FERRY.

MACHINE FOR AUTOMATICALLY MAKING PASTEBOARD STRIPS FOR HAT PACKING RINGS.

No. 523,833. Patented July 31, 1894.

(No Model.) 7 Sheets—Sheet 5.

F. P. FERRY.
MACHINE FOR AUTOMATICALLY MAKING PASTEBOARD STRIPS FOR HAT PACKING RINGS.

No. 523,833. Patented July 31, 1894.

Fig. 5.

WITNESSES:
J. F. Finch.
M. T. Longden.

INVENTOR
F. P. Ferry
BY
J. W. Smith
ATTORNEY

THE NORRIS PETERS CO., PHOTO-LITHO., WASHINGTON, D. C.

(No Model.) 7 Sheets—Sheet 6.
F. P. FERRY.
MACHINE FOR AUTOMATICALLY MAKING PASTEBOARD STRIPS FOR HAT PACKING RINGS.
No. 523,833. Patented July 31, 1894.

WITNESSES:
J. F. Finch.
M. S. Longden.

INVENTOR
F. P. Ferry
BY
J. M. Smith Jr.
ATTORNEY (No Model.)  7 Sheets—Sheet 7.

F. P. FERRY.
MACHINE FOR AUTOMATICALLY MAKING PASTEBOARD STRIPS FOR HAT PACKING RINGS.

No. 523,833.  Patented July 31, 1894.

WITNESSES:
J. F. Finch.
M. T. Lougden.

INVENTOR
F. P. Ferry
BY
ATTORNEY

UNITED STATES PATENT OFFICE.

FRANK P. FERRY, OF DANBURY, CONNECTICUT, ASSIGNOR OF ONE-HALF TO THEODORE CLARK & CO., OF SAME PLACE.

MACHINE FOR AUTOMATICALLY MAKING PASTEBOARD STRIPS FOR HAT-PACKING RINGS.

SPECIFICATION forming part of Letters Patent No. 523,833, dated July 31, 1894.

Application filed March 5, 1894. Serial No. 502,387. (No model.)

*To all whom it may concern:*

Be it known that I, FRANK P. FERRY, a citizen of the United States, residing at Danbury, in the county of Fairfield and State of Connecticut, have invented certain new and useful Improvements in Machines for Automatically Making Pasteboard Strips for Hat-Packing Rings; and I do hereby declare the following to be a full, clear, and exact description of the invention, such as will enable others skilled in the art to which it appertains to make and use the same.

My invention relates to certain new and useful improvements in machines for automatically manufacturing hat packing rings from pasteboard, particularly such rings as are shown and described in Letters Patent No. 444,343, issued to me January 6, 1891.

The object of my present invention is to manufacture this ring economically and with great facility from a continuous strip of pasteboard, and furthermore to provide means which shall accurately and uniformly form a curved bead or roll under both the top and bottom edges of the ring, which bead or roll will not be liable to become distorted after leaving the machine.

Pasteboard packing rings for hats are very desirable, but it is necessary that the edges of such rings should be so protected that chafing against the hat will not occur. It has however been a matter of great difficulty heretofore to provide such rings at a reasonable cost owing to the lack of proper machines for manufacturing them, but my present invention overcomes these difficulties and presents the first instance of a machine capable of automatically making these rings from a continuous strip of pasteboard.

With these ends in view my invention consists of certain details of construction and combination of elements such as will hereinafter fully be set forth and then specifically be designated in the claims.

Referring to the accompanying drawings

Similar numbers of reference denote like parts in the several figures of the drawings.

1 is a frame supported by suitable legs 2. 3 is a shaft suitably journaled transversely within said frame and having on one end ordinary loose and tight pulleys 4 and 5. 6 is a drum keyed upon said shaft and carrying across its periphery a cutter 7 adapted to coöperate with a cutter block 8 secured in the bottom of the frame of the machine, for the purpose presently explained.

9 is a shaft journaled in the frame of the machine parallel with the shaft 3 and provided with a spur wheel 10 which gears with a spur wheel 11 on the shaft 3, whereby motion is imparted from the shaft 3 to the shaft 9.

12 is a roll secured upon the shaft 9.

13, 14, 15 are brackets bolted to the frame of the machine at different points with respect to the roll 12, and 16, 17, 18, are boxes capable of sliding within these respective brackets, said boxes having journaled therein rollers 19, 20, 21, which extend in close proximity to the periphery of the roll 12. These rollers in connection with the large roll 12 serve to feed the strip of paper from which the rings are formed, in the manner presently explained, and extending from the boxes 16, 17, 18 are screws 22, 23, 24, which pass through the brackets, by means of which screws the boxes are adjusted to vary the distance between the roll 12 and the surrounding rolls in order to allow for paper of different thickness. These rollers 19, 20, 21, are respectively mounted on the shafts 25, 26, 27, which latter are journaled within the boxes 16, 17, 18. The rolls 19, 20 are in pairs, the rolls of each pair being arranged so as to operate near opposite ends of the roll 12, while the roller 21 is arranged to operate at the central part of the roll 12.

Secured respectively on the shafts 25, 26, 27, are spur pinions 28, 29, 30, which engage with the spur wheel 31 secured upon the shaft 9, whereby rotary motion will be imparted to the rollers 19, 20, 21.

32 is a bracket rising from the frame of the machine and having journaled in its upper extremity an idle roll 33, and provided with a loop extension 34. On this extension 34 are two adjustable buttons 35, which may be secured upon the loop in any suitable location and at any desired distance apart for the purpose of affording a guide for the paper strip as will be presently set forth. Secured to an upward projection 36 from the frame of the machine is the main guide 37 for the paper strip, such guide being of ordinary construction.

38 is an idle roll journaled in the frame of the machine immediately below the guide 37.

39 is the pasteboard strip which is drawn from a roll placed around an ordinary spool 40 at one end of the frame of the machine.

The width of the roll 12 depends upon the width of the strip of pasteboard, and as the latter will vary in this respect according to the different styles of hats, I provide this roll 12 in various sizes, it being a very simple matter to replace a roll already on the machine with another one. Of course the changing of the roll 12 is followed by the adjustment of the buttons 35, the guide 37 and the rollers 19, 20, and 21, in order that the strip may be properly guided and that the feed rollers may act upon the strip at the proper spaces. These adjustments are all very ordinary and are clearly understood without any detailed description.

My improved machine has hereinbefore been described as capable of feeding the strip from a roll and cutting it off in predetermined lengths, and were it not for the fact that the edges of the strip must be so formed that they will not chafe the hat no further operations would be necessary. It is however essential that during the feeding of the strip of pasteboard the lateral edges of the strip must be curled outwardly so as to form a smooth bead which will not chafe the hat, and I will now describe the means which I employ for accomplishing this result.

As a preliminary to any further description I would call attention to the fact that, the drum 6 is carried by the main shaft 3, while motion is imparted from the latter to the drum 12 by means of the intermeshing spur gears 10, 11, and that during the revolution of this drum 6 the cutter 7 will be caused to sheer past the cutter block 8. The strip after it leaves the roll 12 passes immediately beneath the block 8 so that when the cutter 7 passes this block the strip will be severed. The length of the strip thus severed is of course predetermined by the relative speeds of these spur gears 10 and 11, and in order to cut off a longer or a shorter strip the relative sizes of these gears 10, 11, must be changed. This will clearly be understood since it is only necessary to bear in mind that the faster the speed at which the strip is fed the longer will be the strip which is severed.

Coming now to that part of my invention which relates to the curling over of the lateral edges of the strip, I would describe the same as follows:—For the purpose of accomplishing this result I employ two curling devices, one for each edge of the strip, but as such devices are precisely alike and perform the same function on opposite edges of the strip I will describe but a single one of these devices, referring to the component parts thereof in the singular.

Figure 3:
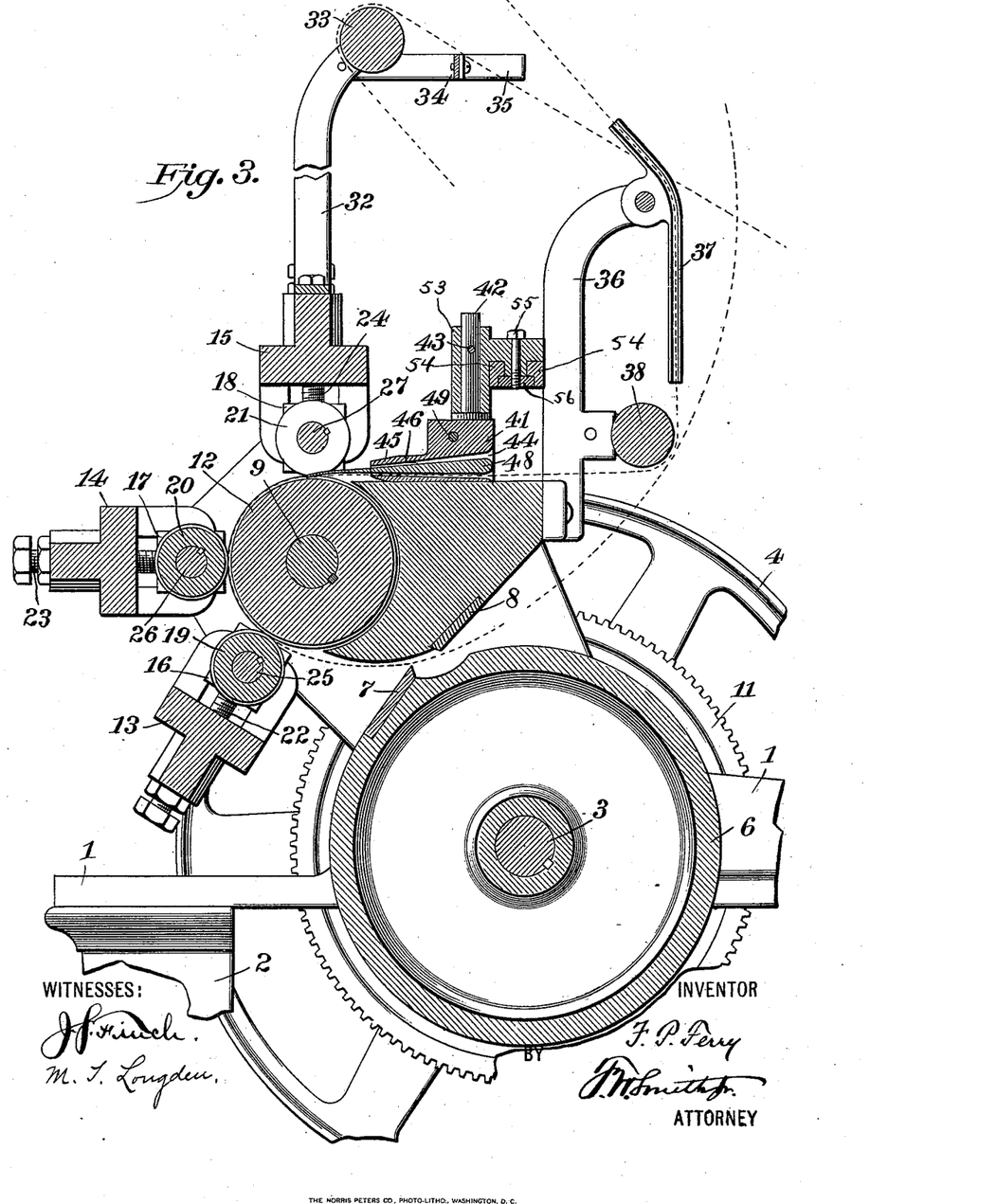
Fig. 3, a section at the line *x*, *x*, of Fig. 1.
Figure 4:
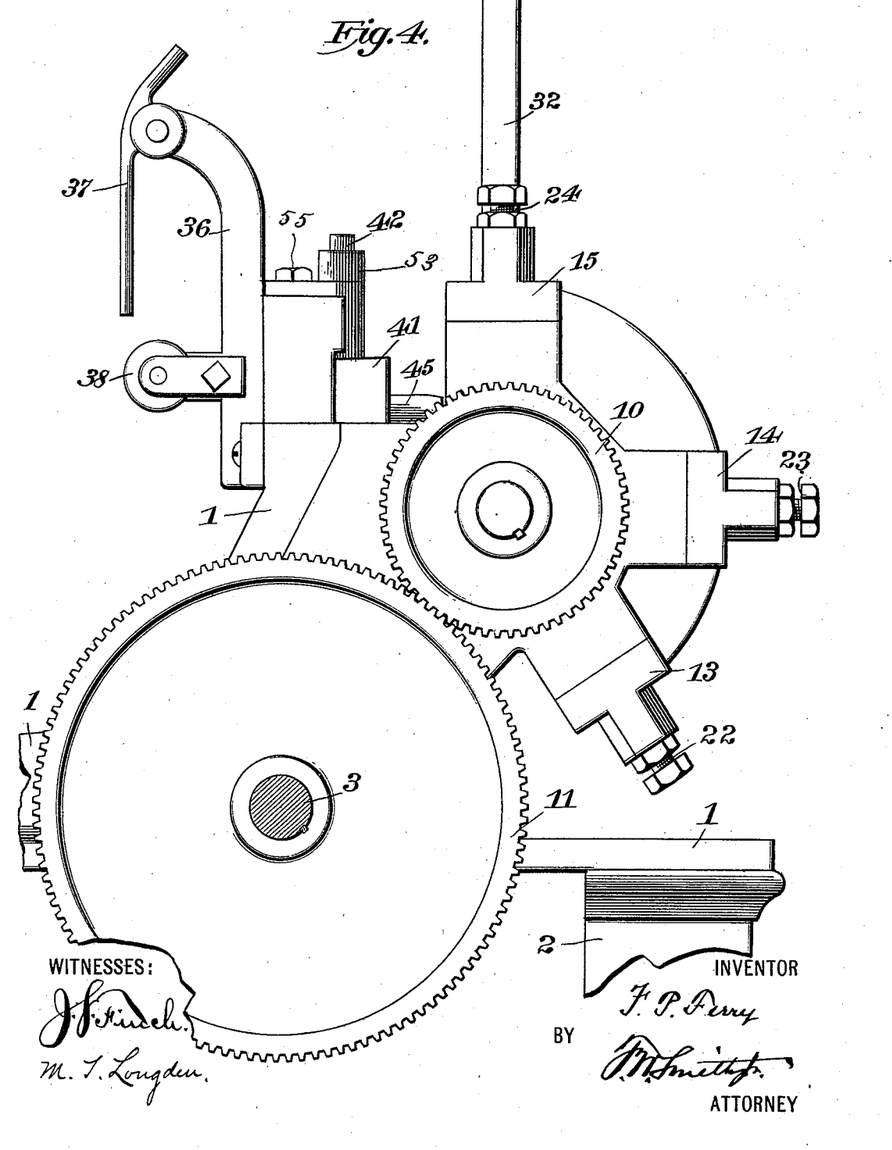
Fig. 4, a section at the line *y*, *y*, of Fig. 1.
Figure 5:
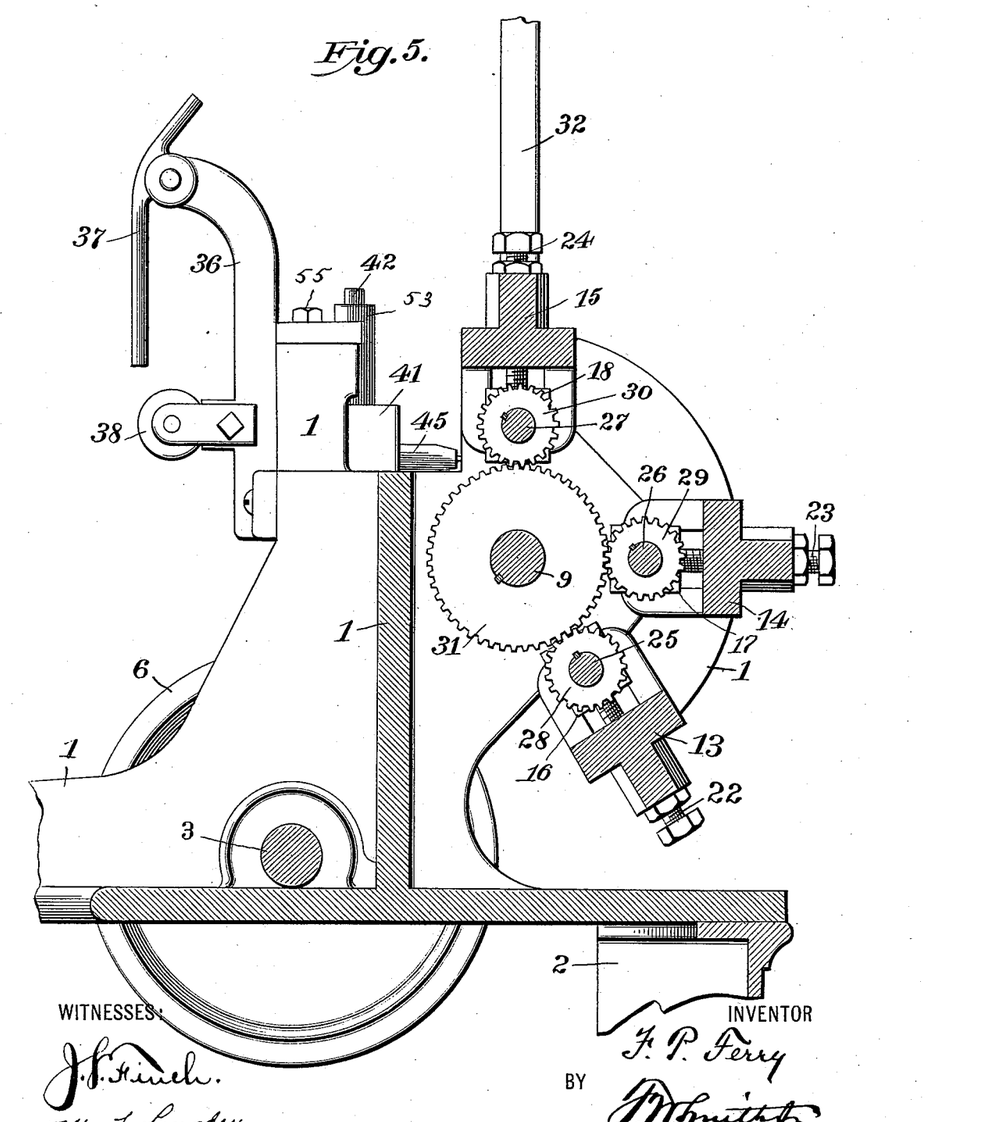
Fig. 5, a section at the line *z*, *z*, of Fig. 1.
Figure 6:
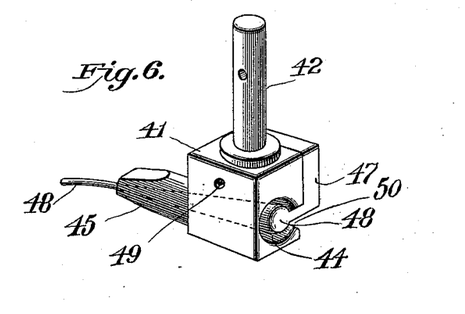
Fig. 6, a detailed perspective of the curling device.

41 is a block from the upper face of which rises a spindle 42 which is secured by means of a pin 43 within a block 53, which latter is guided within a cross bar 54 secured to the frame of the machine, said block 53 being capable of adjustment along said bar, a bolt 55 and nut 56 being employed to secure said block in any desired adjustment. In the lower part of this block is a tapered opening 44 which leads into a quill 45, extending laterally from said block, said quill having extending therethrough a tapered opening 46 which is a continuation of the tapered opening in the block as shown in Fig. 3.

47 is an angle plate having formed therewith a conical shaped elongated mandrel 48. This plate is secured to the block 41 by means of a screw 49 in such manner that the mandrel 48 extends centrally throughout openings 44, 46 and projects for a short distance beyond the quill 45, as clearly shown in Figs. 3, 6, 7 and 8.

The block and angle plate constructed and secured together as above described constitute what I term the "curling device," and there being two of the latter as I have stated they are secured to the frame of the machine at a certain distance from each other so that they will properly act upon the pasteboard strip. In the manufacture of various widths of rings requiring a pasteboard strip of different widths, these curling devices are of course adjusted so that the distance which separates them will correspond with the variations in the width of the strip.

The adjustment of the curling devices is effected by simply loosening the bolts 55 and sliding the blocks 53 along the cross bar 54 until the required distance between said devices is obtained, the blocks 53 being then secured by tightening said bolts.

Figures 7, 8:
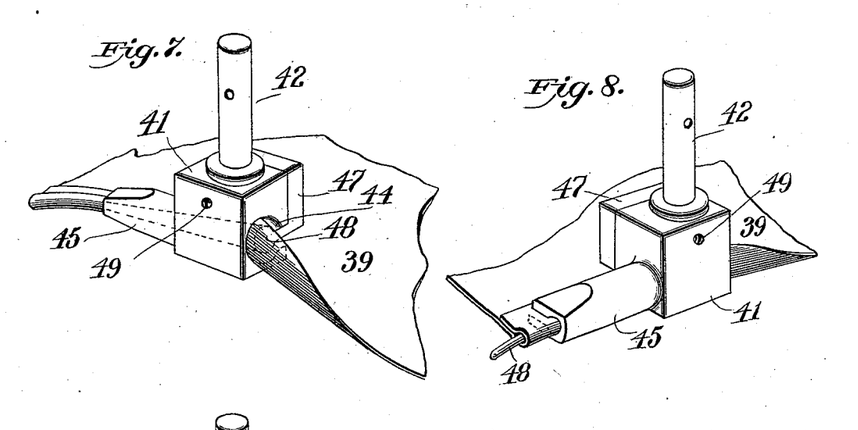
Fig. 7, a similar view of such device showing a strip of paper as it appears when passing therethrough.
Fig. 8, a view illustrating the same feature as is shown at Fig. 7, excepting from a different point of observation.
Figure 9:
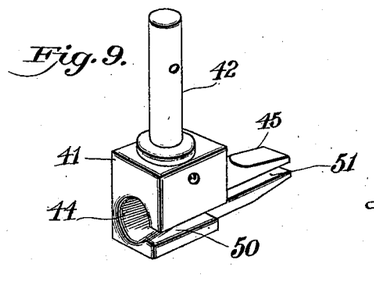
Figs. 9 and 10, are respectively perspectives of the component parts of the curler in detached condition.
Figure 10:
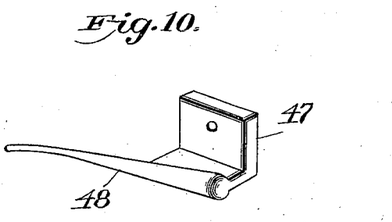
Figure 11:
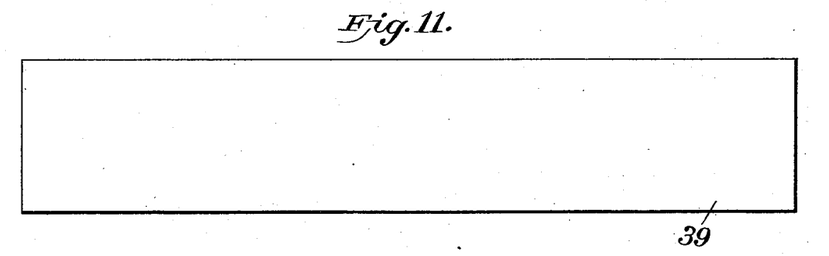
Fig. 11, shows a plain strip of pasteboard such as is used in the manufacture of the rings.

In the manufacture of the rings, the pasteboard strip is led between the buttons 35 up over the idler 33, down through the main guide 37 beneath the idler 38, and then primarily forced by hand through the curling devices, and afterward between the roll 12 and rollers 19, 20, 21. As the strip is forced through the curling devices, the tapered openings 45, 46, will cause the edges of the strip to curl inwardly, and as the strip is fed along this curl will gradually diminish in size so that by the time it reaches the outer extremity of the quill 45 it will be closely conformed around the extremity of the mandrel 48, as shown in Figs. 7 and 8, and as the pasteboard is dampened before it is passed through the curling devices, this curling operation is accomplished with great facility and the bead thus formed becomes permanent and will not get distorted when the strip becomes dry. Gates 50, 51 leading respectively in alignment with each other form the sides of the block 41 and quill 45, and permit the strip to be readily introduced through the curling devices.

Figure 1:
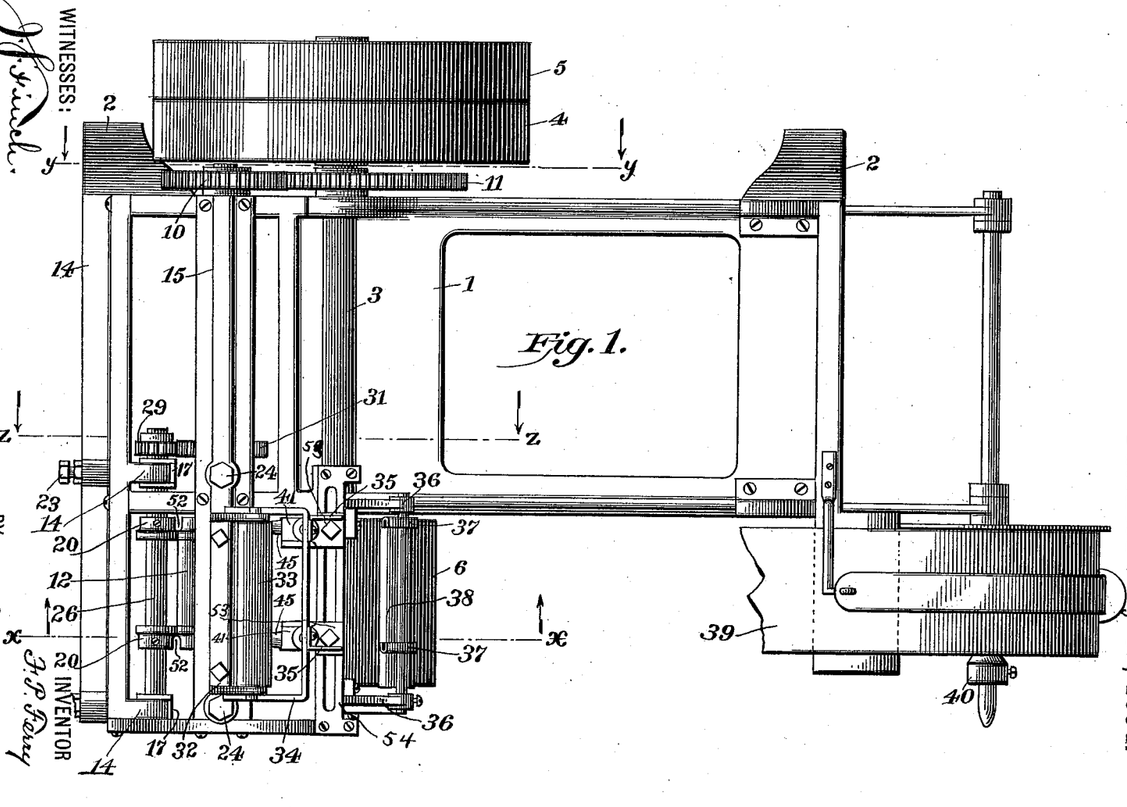
Figure 1, is a plan of my machine.
Figure 2:
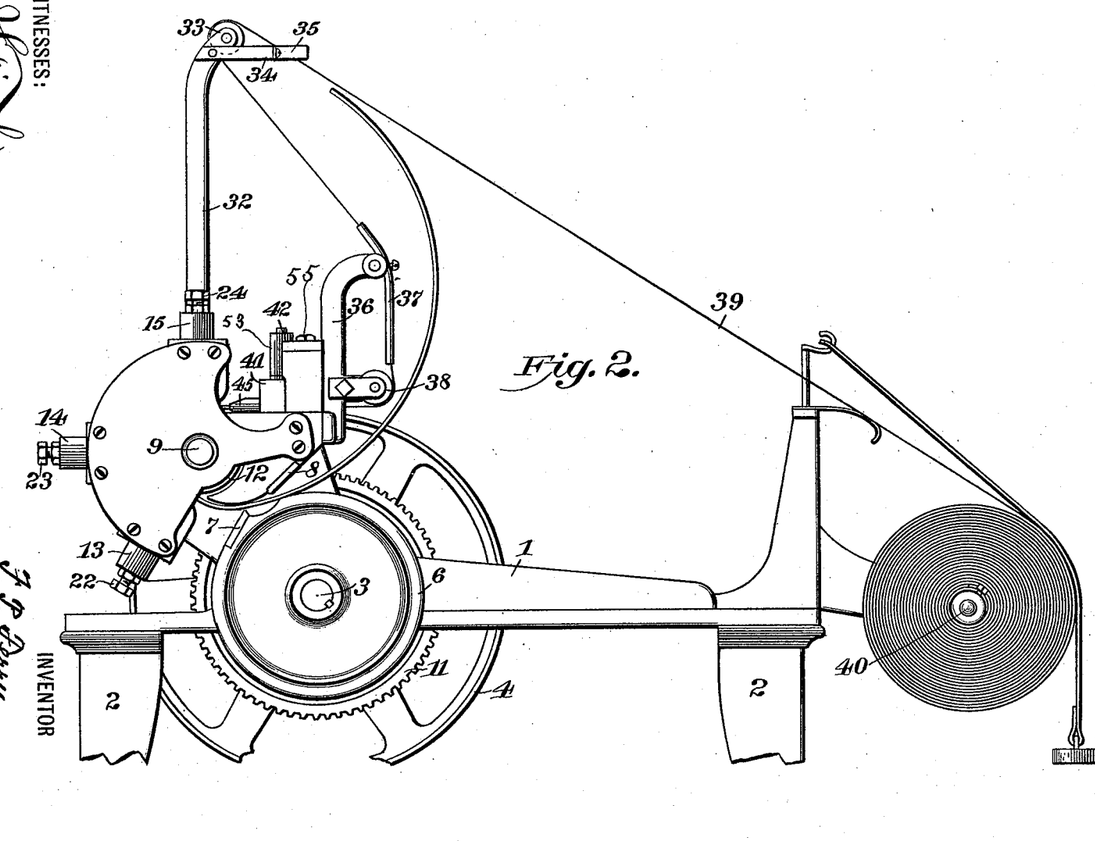
Fig. 2, a side elevation.

The mandrel 48 is indispensable for the purpose of obtaining a smooth and permanent roll at the edges of the strip. As the completed strip is fed through the machine the beaded portions at the edges of such strip pass within spaces 52 between the roll 12 and the rollers 19, 20, these spaces being shown only in the instance of the rolls 20 in Fig. 1.

Figure 12:
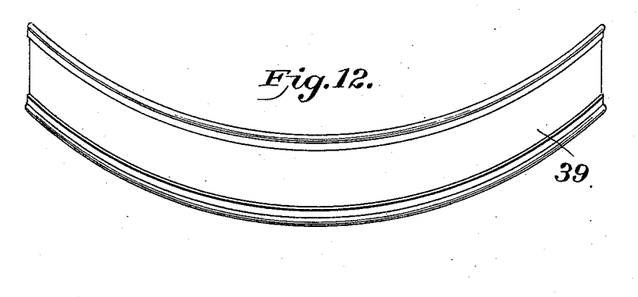
Fig. 12, is a perspective illustrating such strip after it has passed through the curlers and is in finished form preparatory to the joining of the ends to form the ring.
Figure 13:
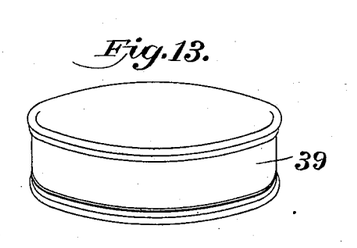
Fig. 13, is a perspective showing the completed ring.

The finished strip as it comes out of the machine and as shown at Fig. 12 is formed into the shape of a ring in any suitable manner, as for instance by inserting the beads at one end within the beads at the other end, any suitable means being employed, if found desirable, for the purpose of securing the ends together. The article is however sold in the form which appears at Fig. 12, since in this shape many thousands can be packed in a small space, it being a very simple matter to make the actual rings from these strips as fast as required for use in the shipment of hats.

The object in drawing the curled strip around the roll 12 is to impart to such strip in the direction of its length a preliminary bend in the arc of a circle in order to greatly facilitate the forming of such strip into a ring. Of course this is merely a matter of convenience since the strip might be drawn through the curlers by means of feed rolls arranged in a horizontal plane and the strip afterward formed around any suitable block by hand, but I prefer to draw the strip around the roll 12 as shown since this greatly contributes to the uniformity of the rings when formed and to the facility with which the strips themselves may be packed for shipment.

Of course any suitable and ordinary devices may be employed for the purpose of guiding the pasteboard strip instead of the devices which I have herein shown and described.

Instead of feeding the pasteboard in the form of a roll as shown, the same may be primarily cut into predetermined lengths and then fed by hand or otherwise, but in this instance it would be necessary either to make the tapered opening 44 so large that there would be sufficient space around the mandrel 48 to enable the strip to be readily thrust through the curling device to the feed rollers beyond, or to provide a set of feed rollers immediately in front of the curling device whereby the strip may be pushed through such device to the feed rollers beyond.

In curling the edges of separate strips it will of course be obvious that all the feeding devices except the pair of rolls immediately beyond the curling devices may be dispensed with. I do not therefore wish to be limited to the curling of the edges of the strip while the latter is fed continuously from a roll, since, as above noted with simple changes and substitutions readily suggested by my invention and clearly within the range of ordinary mechanical skill, I am enabled to curl the pasteboard strips after they are cut into lengths.

Having thus described my invention, what I claim as new, and desire to secure by Letters Patent, is—

1. In a machine for automatically making pasteboard strips for hat packing rings, the combination of the mandrels, devices for curling the edges of the strip around said mandrels and for disposing the extremities of said edges flat against the strip whereby hollow beads are formed and stayed at said edges, and means for feeding the strip during the formation of said beads, substantially as set forth.

2. In a machine for automatically making pasteboard strips for hat packing rings, the combination of the mandrels, devices for curling the edges of the strips around said mandrels and for disposing the extremities of said edges flat against the strip whereby hollow beads are formed and stayed at said edges, and means for grasping the strip between said curled beads and drawing the same through the curling devices, substantially as set forth.

3. In a machine for automatically making pasteboard strips for hat packing rings, the combination of a main feed roll, a series of auxiliary feed rolls arranged around the first mentioned roll, curling devices through which the edges of the strip are passed to the feed rolls which latter operate to continuously draw the strip through the curling devices, and instrumentalities beyond the feed rolls for cutting the curled strip into predetermined lengths, substantially as set forth.

4. In a machine for making pasteboard strips for hat packing rings, the herein described device for curling the edges of the strip, comprising a block having extending therethrough a tapered elongated opening provided with a lateral gate, and an angle plate having formed therewith a conical shaped elongated mandrel, said plate being secured to such block with the mandrel extending centrally throughout said tapered opening, substantially as set forth.

5. In a machine for automatically making pasteboard strips for hat packing rings, the combination of automatically operating appliances for continuously feeding the strip, for curling the lateral edges of the same while the strip is being fed through the machine, for imparting to the curled strip a preliminary bend in the arc of a circle, and for severing the strip thus curled and bent into predetermined lengths, substantially as set forth.

6. In a machine for making pasteboard strips for hat packing rings, the combination of the block having extending therethrough a tapered elongated opening provided with a lateral gate, the angle plate having formed therewith a conical shaped elongated mandrel and secured to said block with the mandrel extending centrally throughout said tapered opening, and means for feeding the strip through said block and around said mandrel, substantially as set forth.

In testimony whereof I affix my signature in presence of two witnesses.

FRANK P. FERRY.

Witnesses:
JABEZ AMSBURY,
JOSEPH E. PLATT.